(12) United States Patent
White et al.

(10) Patent No.: US 10,672,182 B2
(45) Date of Patent: Jun. 2, 2020

(54) COMPACT VISIBILITY STATE FOR GPUS COMPATIBLE WITH HARDWARE INSTANCING

(71) Applicant: Microsoft Technology Licensing, LLC, Redmond, WA (US)

(72) Inventors: John David White, Bowen Island (CA); Martin Jon Irwin Fuller, Warwick (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 36 days.

(21) Appl. No.: 15/957,471

(22) Filed: Apr. 19, 2018

(65) Prior Publication Data
US 2019/0325639 A1    Oct. 24, 2019

(51) Int. Cl.
*G06T 15/40*    (2011.01)
*G06T 17/10*    (2006.01)
*G06T 1/20*    (2006.01)

(52) U.S. Cl.
CPC .............. *G06T 15/405* (2013.01); *G06T 1/20* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 6,359,629 B1 | 3/2002 | Hoperoft et al. | |
| 6,597,363 B1 * | 7/2003 | Duluk, Jr. ............. | G06T 15/005 345/506 |
| 7,187,377 B1 * | 3/2007 | Pella ....................... | G06T 15/40 345/419 |
| 9,607,426 B1 * | 3/2017 | Peterson ................ | G06T 15/06 |
| 2002/0196252 A1 | 12/2002 | Liao et al. | |
| 2006/0114261 A1 * | 6/2006 | Morphet ................ | G06T 15/40 345/553 |
| 2014/0176544 A1 * | 6/2014 | Fishwick ................ | G06T 15/10 345/423 |

(Continued)

OTHER PUBLICATIONS

"International Search Report and Written Opinion Issued in PCT Application No. PCT/US19/026201", dated May 27, 2019, 11 Pages.

*Primary Examiner* — Yu Chen
(74) *Attorney, Agent, or Firm* — Ray Quinney & Nebeker; Tiffany Healy

(57) ABSTRACT

Methods and devices for rendering visible primitives in a scene of an application may include loading a primitive visibility buffer that includes a plurality of primitives representing at least one instance in a scene of the application. The primitive visibility buffer may include for each primitive of the plurality of primitives a visibility bit that describes a visibility state as visible or not visible for each of the plurality primitives. The methods and devices may include determining whether each of the plurality of primitives are visible in the scene based on the visibility bit, rendering a primitive when the visibility bit for the primitive indicates that the primitive is visible, and skipping the rendering of the primitive when the visibility bit indicates that the primitive is not visible. The methods and devices may also include combing pre-computed visibility states with runtime visibility testing when rendering the visibility bits.

19 Claims, 5 Drawing Sheets

(56) References Cited

U.S. PATENT DOCUMENTS

2014/0267258 A1\* 9/2014 Yang .................... G06T 15/005
　　　　　　　　　　　　　　　　　　345/422
2014/0354661 A1　12/2014　Balci et al.
2017/0352182 A1　12/2017　Wang et al.

\* cited by examiner

| 14 | 28 | |
|---|---|---|
| Book 1 | 1 | 202 |
| Book 2 | 0 | 204 |
| Book 3 | 1 | 206 |
| Book 4 | 0 | 208 |

FIG. 2

| | 14 | 306 | 308 | 310 | 312 | 314 | 316 | 318 | 320 |
|---|---|---|---|---|---|---|---|---|---|
| 302 | Book 1 | 1 | 0 | 0 | 1 | 0 | 1 | 1 | 0 |
| 304 | Book 3 | 1 | 1 | 0 | 0 | 1 | 1 | 1 | 1 |

FIG. 3

COMPACT VISIBILITY STATE FOR GPUS COMPATIBLE WITH HARDWARE INSTANCING

BACKGROUND

The present disclosure relates to computer devices and graphics processing.

Currently, in graphics, before you render a geometric primitive for a computer game, a list is built indicating which mesh instances and primitives are visible. As such, computer games are increasingly pre-processing mesh instances and primitives to determine their visibility as a pre-process prior to executing the normal graphics processing unit (GPU) rendering pipeline. To do this computer games must write out a per frame list of mesh instance data and primitives to process.

The visibility testing and compaction of per instance data is typically done on the central processing unit (CPU). Generally, a compute shader on the GPU may determine whether a primitive is visible, generally these are triangles. Each GPU thread processes a single triangle, testing to ensure whether the triangle is front facing to the viewer, not off screen, not zero area, and/or not occluded. If the triangle is visible, then each thread writes out the triangle's three vertex indices. It also increments a total number of triangles to render.

This GPU's rendering pipeline requires either 32 bit or 16 bit vertex indices. When not using triangle pre-culling, 16 bit is the most commonly used due to the compact storage. Compute shaders in the culling phase, however, are typically incapable of writing just 16 bits of memory. Therefore, if 16 bit indices are to be used, implementations pre-zero the output index buffer (which has a cost), and then an atomic-OR the high or low 16 bit of the vertex index which will share a 32 bit word with a triangle index written by a different GPU thread. The thread may pack the other two vertex indices into a single 32 bit write. Each thread therefore has to work out which of the first or last vertex index is the one which requires an atomic-OR, and pack the three indices into the correct 16 bits. Because of this complexity and the use of atomic operations, many implementations chose to use 32 bit indices, but this increases the memory cost and bandwidth requirement.

Once the culling process is complete, the GPU can move on to the traditional rendering phase. Due to non-determinism on the GPU, different groups of threads process different triangles at different times. This results in a re-ordering of the original triangle lists, which may negatively impact vertex cache hits during the subsequent GPU rendering phase.

Thus, there is a need in the art for improvements in visibility determinations.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, a graphics processing unit, an operating system in communication with the memory, the processor, and the graphics processing unit. The graphics processing unit may be operable to load a primitive visibility buffer that includes a plurality of primitives representing at least one instance in a scene of an application, wherein the primitive visibility buffer includes for each primitive of the plurality of primitives a visibility bit that describes a visibility state as visible or not visible for each of the plurality primitives; determine whether each of the plurality of primitives are visible in the scene based on the visibility bit; render a primitive when the visibility bit for the primitive indicates that the primitive is visible; and skip the rendering of the primitive when the visibility bit indicates that the primitive is not visible.

Another example implementation relates to a method for rendering visible primitives in a scene of an application. The method may include loading, at a graphics processing unit executing on the computer device, a primitive visibility buffer that includes a plurality of primitives representing at least one instance in a scene of the application, wherein the primitive visibility buffer includes for each primitive of the plurality of primitives a visibility bit that describes a visibility state as visible or not visible for each of the plurality primitives. The method may also include determining whether each of the plurality of primitives are visible in the scene based on the visibility bit. The method may also include rendering a primitive when the visibility bit for the primitive indicates that the primitive is visible. The method may also include skipping the rendering of the primitive when the visibility bit indicates that the primitive is not visible.

Another example implementation relates to computer-readable medium storing instructions executable by a computer device. The computer-readable medium may include at least one instruction for causing the computer device to load a primitive visibility buffer that includes a plurality of primitives representing at least one instance in a scene of an application, wherein the primitive visibility buffer includes for each primitive of the plurality of primitives a visibility bit that describes a visibility state as visible or not visible for each of the plurality primitives. The computer-readable medium may include at least one instruction for causing the computer device to determine whether each of the plurality of primitives are visible in the scene based on the visibility bit. The computer-readable medium may include at least one instruction for causing the computer device to render a primitive when the visibility bit for the primitive indicates that the primitive is visible. The computer-readable medium may include at least one instruction for causing the computer device to skip the rendering of the primitive when the visibility bit indicates that the primitive is not visible.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 2 is an example of an instance visibility buffer in accordance with an implementation of the present disclosure;

FIG. 3 is an example of a primitive visibility buffer in accordance with an implementation of the present disclosure;

DETAILED DESCRIPTION

Figure 1:
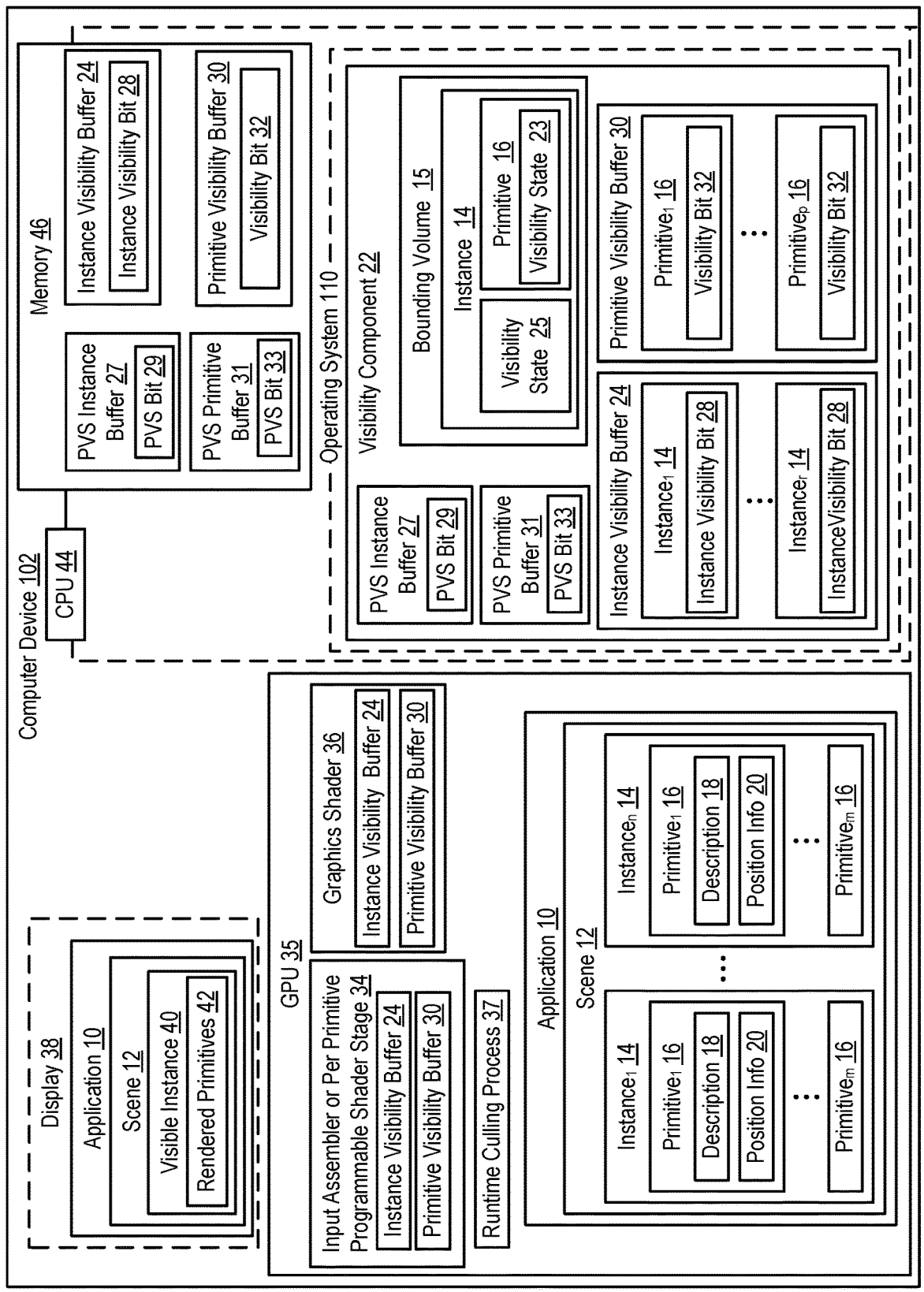
FIG. 1 is a schematic block diagram of an example computer device in accordance with an implementation of the present disclosure.

This disclosure relates to devices and methods for determining a visibility state of instances and/or primitives in a scene and/or image of a graphics-based application, such as, but not limited to, a game. Increasingly, computer games are pre-processing triangles to determine a visibility of the triangles as a pre-process prior to executing the normal graphics processing unit (GPU) rendering pipeline by writing out a per frame list of triangles to process. Existing triangle pre-culling solutions do not work with hardware instancing due to every instance of the mesh having a unique set of visible triangles. Games must either issue a draw call per instance, some of which may have very few or no triangles. As such, games employing triangle pre-culling may end up draw call issue bound, either on the GPU and/or the central processing unit (CPU). Alternatively, games employing triangle pre-culling may write out the transformed positions of each vertex to create a single large draw call for all instances, which requires considerably more bandwidth and memory for temporary storage. In addition, in the GPU rendering pipeline, the same vertex referenced by two different instances is not shared. Thus, further increasing the bandwidth demand.

Instead of writing out new triangle lists, the devices and methods described herein may generate an instance visibility buffer describing a visibility state of each instance. In addition, the devices and methods may generate a primitive visibility buffer describing a visibility state of primitives that compose the instances. Primitives may include, but are not limited to, triangles, quads, polygons, lines, points, a patch in a curved surface or tessellation scheme, and/or bounding volumes, which might in turn include further primitives. The devices and methods may work with any topology (e.g., individual triangles, triangle strips, and triangle fans). In addition, the devices and methods may maintain an ordering of primitive submissions so that the primitive order remains optimal for vertex cache hits.

The devices and methods may record a single bit per primitive per instance that may be used in determining whether to render the primitive. Previous solutions recorded three indices per triangle, as such, 6 bytes or 12 bytes were generally used to indicate whether a triangle was visible or not visible. Thus, by recording a single bit per primitive per instance, the devices and methods may work with hardware instancing, save memory and/or bandwidth, and may be considerably more efficient for the primitive culling process work.

The devices and methods may also record a single bit per instance indicating whether to render the instance. Recording a single bit per instance may eliminate the per frame compaction of per instance data, such as transforms, which almost all games are doing currently on the CPU. The devices and methods may also render the bit per instance to identify whether the instance is visible. In addition, the devices and methods may combine pre-computed visibility states with runtime visibility testing when rendering the visibility bits for both instances and/or individual primitives.

The devices and methods may significantly reduce the memory and bandwidth requirement for both primitive pre-culling and hardware instancing by using a single bit to identify the visibility states. In addition, the devices and methods may simplify the complexity of primitive culling implementations by removing all atomic memory operations. The devices and methods may also remove the per-instance data compaction step in hardware instance implementations currently used by practically all AAA video game engines. The devices and methods may also work with hardware instancing, which current primitive culling implementations do not, thereby fixing the 'small draw call problem.'

Referring now to FIG. 1, an example computer device 102 for use in connection with determining a visibility state of primitives 16 may include a graphics-based application 10, such as, but not limited to, a game, that may include one or more scenes 12 and/or images that may be presented on display 38. Display 38 may be integrated within computer device 102. For instance, display 38 may be a screen of a mobile telephone. Alternatively, display 38 may be a stand-alone device coupled to computer device 102 via a wired or wireless communications link. For instance, display 38 may be a computer monitor or flat panel display connected to a personal computer via a cable or wireless link. In another example, display 38 (and computer device 102) may be part of a head-mounted display, such as a virtual reality (VR), mixed reality (MR), or augmented reality (AR) device.

Within each scene 12 and/or image of application 10, there may be a plurality of instances 14 (up to n, where n is an integer) representing various objects in the scene 12. Each instance 14 may be a logical mesh made up of a plurality of primitives 16 (up to m, where m is an integer) that depict the object in the scene 12 and/or image. Primitives may include, but are not limited to, triangles, quads, polygons, lines, points, a patch in a curved surface scheme, and/or bounding volumes, which might in turn include further primitives. For example, there may be plurality of instances 14 representing books in the scene 12, while other instances 14 may represent candles in the scene 12.

Each primitive 16 may include description information 18 that includes, for example, the three points of a triangle and/or other coordinate information the identifies the shape of the primitive 16. In addition, each primitive 16 may include position information 20 indicating the position of the primitive 16. The description information 18 and/or position information 20 may be used to identify the location of the primitives 16 in the scene 12 and/or image.

A visibility state 23 of each primitive 16 may be used when rendering the scene 12 and/or image of application 10 so that only primitives 16 that are visible in the scene 12 may be rendered.

Computer device 102 may include an operating system 110 executed by CPU 44 and/or system memory 46 of computer device 102. System memory 46 may be configured for storing data and/or computer-executable instructions defining and/or associated with operating system 110, and CPU 44 may execute operating system 110. An example of system memory 46 can include, but is not limited to, a type of memory usable by a computer, such as random access memory (RAM), read only memory (ROM), tapes, magnetic discs, optical discs, volatile memory, non-volatile memory, and any combination thereof. An example of CPU 44 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a server computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may also include a visibility component 22 that may predetermine a visibility state of the one or more instances 14 and/or primitives 16 depicted in a scene 12 and/or image of application 10. Visibility component 22 may be executed by GPU 35 and/or by a CPU of computer device 102.

In an implementation, an offline and/or a pre-computed visibility determination may be performed to determine the potential visible set (PVS) of instances 14 and/or primitives 16 of the scene 12 and/or image. For example, visibility component 22 may perform occlusion culling to estimate whether the instances 14 and/or primitives 16 may be visible in the scene 12 and/or image. This potential visibility set may be stored as bits per instance and/or bits per primitive. For example, the potential visibility set may be stored as a PVS instance buffer 27 and/or a PVS primitive buffer 31. The PVS instance buffer 27 may include a PVS bit 29 for each instance that describes the potential visibility of each instance 14 in the scene 12 and/or image. In addition, the PVS primitive buffer 31 may include a PVS bit 33 for each primitive 16 that describes the potential visibility of each primitive 16 in the scene 12 and/or image.

Visibility component 22 may generate an instance visibility buffer 24 with an instance visibility bit 28 describing the visibility of the instances 14 in application 10. For each instance that visibility component 22 determines that may be potentially visible, as represented by the potential visibility set bits 29, visibility component 22 may set the instance visibility bit 28 for the instance 14 to "1." If visibility component 22 determines that an instance 14 may not be visible, visibility component 22 may set the instance visibility bit 28 for the instance 14 to "0."

Visibility component 22 may also generate a primitive visibility buffer 30 with a visibility bit 32 describing the visibility of the primitives 16 for each instance 14. For each primitive 16 that visibility component 22 determines that may be potentially visible, as represented by the potential visibility set bits 33, visibility component 22 may set the visibility bit 32 for the primitive 16 to "1." If visibility component 22 determines that primitive 16 may not be visible, visibility component 22 may set the visibility bit 32 for the primitive 16 to "0."

In addition, visibility component 22 may perform one or more culling operations at runtime to determine a visibility state 23 of the one or more primitives 16 in the scenes 12 and/or images of application 10. The visibility state 23 may identify whether the primitives 16 are visible or not visible by a camera in the scene 12 and/or image. In an implementation, visibility component 22 may use any predetermined and/or pre-computed visibility states of the primitives 16 when performing the runtime visibility determinations of the primitives 16. If a corresponding visibility bit 32 for a primitive 16 is "0," visibility component 22 may skip the runtime visibility determination for the primitive 16. However, if the corresponding visibility bit 32 for a primitive 16 is "1," visibility component 22 may perform a runtime visibility determination for the primitive 16 to verify that the primitive 16 is visible in the scene 12 and/or image.

For example, visibility component 22 may perform a back face culling operation to determine whether the primitives 16 are facing away from the camera. Visibility component 22 may determine that the visibility state 23 is not visible for the primitives 16 facing away from the camera. Visibility component 22 may determine that the visibility state 23 is visible for the primitives 16 facing towards the camera.

Visibility component 22 may also perform a frustum culling operating to determine whether the primitives 16 are within a view of a camera. If the primitives 16 are within view of the camera, visibility component 22 may determine that the visibility state 23 of the primitives 16 are visible. If the primitives 16 are outside of the view of the camera, visibility component 22 may determine that the visibility state 23 of the primitives 16 are not visible.

Visibility component 22 may also perform a zero area culling operations to determine whether a size of the primitives 16 may be too small to make a contribution to the scene 12 and/or image. For example, visibility component 22 may compare the coverage of a primitive 16 to determine if any pixels or samples are covered. When no pixels or samples are covered by the primitive 16, visibility component 22 may determine that the visibility state 23 for the primitive 16 is not visible. However, if any pixels or samples of the primitive 16 are covered, visibility component 22 may determine that the visibility state 23 for the primitive 16 is visible.

Visibility component 22 may also perform an occlusion culling to determine whether a primitive 16 is behind another object, and thus, may be obstructed from view. For example, if the primitive 16 is obstructed from view by another object in the scene 12, visibility component 22 may determine that the visibility state 23 for the primitive 16 is not visible. If the primitive 16 is not obstructed from view by another object in the scene 12, visibility component 22 may determine that the visibility state 23 for the primitive 16 is not visible.

Visibility component 22 may generate a primitive visibility buffer 30 with a visibility bit 32 describing the visibility of the primitives 16 in application 10. The visibility bit 32 may correspond to the visibility state 23 previously determined by visibility component 22. For example, if the visibility state 23 is visible for the primitive 16, the visibility bit 32 may be assigned a "1." If the visibility state 23 is not visible for the primitive 16, the visibility bit 32 may be assigned a "0." As such, a single bit may be used to describe the visibility state of each primitive 16 in the application 10. For example if there are 60 triangles per instance and 100 instances in the application 10, the primitive visibility buffer may include 6000 bits describing the visibility states 23 of each primitive 16 per instance 14.

Visibility component 22 may also perform one or more culling operations to determine the visibility of the one or more instances 14. In an implementation, visibility component 22 may use any predetermined and/or pre-computed visibility states of the instances 14 when performing the runtime visibility determinations of the instances 14. If a corresponding instance visibility bit 28 for an instance 14 is "0," visibility component 22 may skip the runtime visibility determination for the instance 14. However, if the corresponding instance visibility bit 28 for an instance 14 is "1," visibility component 22 may perform a runtime visibility determination for the instance 14 to verify that the instance 14 is visible in the scene 12 and/or image.

For example, visibility component 22 may process a bounding volume 15 of the mesh associated with an instance 14 and compare the bounding volume 15 against a frustum and/or occlusion data to determine whether the instance 14 is visible It may also cull the volume based on distance or screen space area. The bounding volume 15 may completely contain the logical mesh of primitives 16 of the instance 14. For example, the bounding volume 15 may include, but is not limited to, a sphere and/or a box surrounding the instance 14. When the comparison indicates that the instance 14 is visible, the visibility state 25 of the instance 14 may be set to visible. When the comparison indicates that the instance 14 is not visible, the visibility state 25 of the instance 14 may be set to not visible. In an implementation, visibility component 22 may perform one or more culling operations on the meshes for a particular object (e.g., all of the candles) in the scene 12 and/or image before processing all of the meshes for a different object (e.g., books) in the scene 12 and/or image.

Visibility component 22 may generate an instance visibility buffer 24 with an instance visibility bit 28 describing the visibility of the instances 14 in application 10. For example, the instance visibility bit 28 may be set to "1" if the visibility state 25 of the instance 14 is visible. In addition, the instance visibility bit 28 may be set to "0" if the visibility state 25 of the instance 14 is not visible. As such, the visibility of each instance 14 may be described using the instance visibility bit 28 instead of copying and/or compacting instance data (e.g., transformation matrices) based on the visibility result.

For example, a scene 12 may have a plurality of candles on top of a table, each with 100 triangles. Visibility component 22 may make a visibility determination for each candle on top of the table to determine whether the candle is visible, and if the candle is visible, visibility component 22 may determine which triangles of the candle are visible. If the candle is visible, visibility component 22 may write out a "1" bit for the instance visibility bit 28 in the instance visibility buffer 24. If the candle is not visible, visibility component 22 may write out a "0" bit for the instance visibility bit 28 in the instance visibility buffer 24. For example, one candle may have 50 triangles visible. As such, visibility component 22 may write out a "1" bit for the visibility bit 32 for each of the 50 primitives 16 visible for that candle and may write out a "0" bit for the visibility bit 32 for each of the 50 primitives 16 not visible.

In an implementation, visibility component 22 may only perform the culling operations on the primitives 16 of instances 14 that are visible (e.g., instances 14 where the instance visibility bit 28 is set to "1"). Visibility component 22 may skip the culling operations on primitives 16 of instances 14 that are not visible (e.g., instances 14 where the instance visibility bit 28 is set to "0").

In an implementation, a graphics shader 36, such as a compute shader, may execute the visibility component 22 to process the primitive pre-culling operations and/or the instance pre-culling operations and generate the primitive visibility buffer 30 and/or the instance visibility buffer 24. For example, each thread in a compute shader may processes a single primitive (e.g., triangle) or instance. However, instead of writing out a new index buffer, each thread records the visibility state in a single visibility bit 32. The visibility bits 32 may be packed into a single memory operation using a 'wave-wide' operation such as bitwise-OR. Each wave may efficiently write the visibility state for multiple primitives per memory operation, normally a 32 or 64 bit write. As such, there is no need for atomic operations, nor is there a count of the number of visible primitives. Moreover, a significant reduction in storage may occur because a single visibility bit per primitive is stored in the primitive visibility buffer instead of existing solutions that store 48 or frequently 96 bits for the three vertexes indices per visible primitive and 48 bytes or more per visible instance.

In another implementation, an input assembler or per primitive programmable shader stage 34, such as but not limited to, hull shaders, geometry shaders, and/or mesh shaders, may execute the visibility component 22 to process the primitive pre-culling operations and/or the instance pre-culling operations and generate the primitive visibility buffer 30 and/or the instance visibility buffer 24.

In another implementation, when the hardware is performing a depth pre-pass to render scene 12, the hardware may generate the primitive visibility buffer 30 and/or the instance visibility buffer 24.

The offline visibility determination results may be stored at either the instance and/or primitive level. For example, instance visibility buffer 24 and/or primitive visibility buffer 30 may be stored in memory 46.

At runtime of application 10, GPU 35 may copy the offline visibility results for the instance visibility buffer 24 and/or primitive visibility buffer 30 into the frame's bit stream. GPU 35 may perform a runtime culling process 37 that performs a runtime instance culling and/or primitive culling passes. The runtime culling and/or primitive passes may read the instance visibility buffer 24 and/or the primitive visibility buffer 30, and only perform a runtime check if the instance visibility bit 28 and/or visibility bit 32 is "1."

In an implementation, GPU 35 may skip the runtime culling process 37 and may use the instance visibility bits 28 and/or visibility bits 32 of the instance visibility buffer 24 and/or the primitive visibility buffer 30 without any runtime culling.

After the runtime culling process 37, the GPU rendering pipeline may be invoked with one or both of the instance visibility buffer 24 and/or the primitive visibility buffer 30 bound to GPU 35. When a buffer is not bound, the buffer's contents may be assumed to be entirely "1" bits.

Input assembler or per primitive programmable shader stage 34 may load the instance visibility buffer 24 and/or the primitive visibility buffer 30. Input assembler or per primitive programmable shader stage 34 may identify the instances 14 visible in the scene 12 based at least upon the instance visibility bits 28 in the instance visibility buffer 24. In addition, input assembler or per primitive programmable shader stage 34 may identify the primitives 16 visible in the scene based at least upon the visibility bits 32 in the primitive visibility buffer 30.

Input assembler or per primitive programmable shader stage 34 may skip processing entire instances 14 and/or individual primitives 16 when the instance visibility bits 28 and/or the visibility bits 32 indicate that the instances 14 and/or primitives 16 are not visible. As such, input assembler or per primitive programmable shader stage 34 may not process everything in the scene but may only process primitives 16 and/or instances 14 that are visible. For example, when the instance visibility bit 28 are "1," input assembler or per primitive programmable shader stage 34 may further process the primitives 16 for the visible instances 14. However, when the instance visibility bit is "0," input assembler or per primitive programmable shader stage 34 may skip further processing of the primitives 16 associated with the nonvisible instance 14.

Once input assembler or per primitive programmable shader stage 34 identifies the visible instances 14 and/or primitives 16 in the scene 12, a graphics shader 36, such as a pixel shader, may render the visible primitives 16 in the scene 12. As such, the pixel shader may only shade the pixels of primitives 16 that are viewable in the scene 12.

The rendered primitives 42 may be transmitted for presentation on display 38. Display 38 may present the scene 12 of application 10 with the rendered primitives 42 depicting the visible instances 40 in the scene 12.

The pixel pipeline may be kept busy by only rendering the primitives 16 and/or instances 14 that are visible. As such, the pixel pipeline may not have downtime trying to figure out whether a primitive 16 and/or instance 14 may be visible in the scene 12 and efficiency may be improved.

For example, if a camera is in one room, the objects in the next room are not visible. As such, input assembler or per primitive programmable shader stage 34 may use this information to only process primitives 16 and/or instances 14 that are visible in the current room. In addition, a particular light source may be used in the room and the pre-calculated visibility determinations may identify primitives 16 that are not visible for the light source. As such, input assembler or per primitive programmable shader stage 34 may skip the processing of the primitives 16 that are not visible for that particular light source when rendering the light's shadow map.

In an implementation, the primitive visibility buffer 30 and/or instance visibility buffer 24 may be read instead by a programmable graphics shader 36. For example in DirectX, a geometry shader or hull shader, both of which operate at the primitive level, may read and/or write the primitive visibility buffer 30.

Therefore, a significant reduction in the memory and bandwidth requirement for both primitive pre-culling and hardware instancing may occur by using a single bit to identify the visibility states of the instances and/or primitives. In addition, all atomic memory operations may be removed, thus, simplifying the complexity of primitive culling. Moreover, copying transforms and obtaining a final count may not be necessary since the GPU may only load transform data for instances which instance visibility bit 28 indicates are visible. As such, the per-instance data compaction step in hardware instance implementations may be removed, also the count of the total number of visible instances this frame.

Referring now to FIG. 2, an example instance visibility buffer 24 may include a plurality of instances 14 in a scene 12 (FIG. 1) and/or image of application 10 (FIG. 1), along with instance visibility bits 28 indicating whether the instances 14 are visible. For example in this case, row 202 of instance visibility buffer 24 may indicate that "Book 1" is visible (e.g., the instance visibility bit 28 is set to "1"). Row 204, of instance visibility buffer 24 may indicate that "Book 2" is not visible (e.g., the instance visibility bit 28 is set to "0"). Row 206 may indicate that "Book 3" is visible (e.g., the instance visibility bit 28 is set to "1"). Row 208 may indicate that "Book 4" is not visible (e.g., the instance visibility bit 28 is set to "0").

As such, instance visibility buffer 24 may store the visibility descriptions describing the visibility states of each instance 14 in the scene 12. The visibility states of the instances may be used to improve the rendering process by only rendering instances 14 that are visible in the scene 12.

Referring now to FIG. 3, an example primitive visibility buffer 30 may include a plurality of instances 14 and a plurality of visibility bits 32 for each of the triangles that make up the instances 14. For example in this case, primitive visibility buffer 30 may include two instances (e.g., "Book 1" and "Book 3") with eight triangles 306, 308, 310, 312, 314, 316, 318, and 320. In addition, visibility buffer may include eight visibly bits 32 for each of the triangles 306, 308, 310, 312, 314, 316, 318, and 320.

Primitive visibility buffer 30 may store the visibility descriptions describing the visibility states for each of the eight triangles that make up "Book 1" and "Book 2." For example, row 302 may indicate that for "Book 1," triangle 306 is visible (e.g., the visibility bit 32 is set to "1"), triangles 308 and 310 are not visible (e.g., the visibility bit 32 is set to "0"), triangle 312 is visible (e.g., the visibility bit 32 is set to "1"), triangle 314 is not visible (e.g., the visibility bit 32 is set to "0"), triangles 316 and 318 are visible (e.g., the visibility bit 32 is set to "1"), and triangle 320 is not visible (the visibility bit 32 is set to "0"). Row 304 may indicate that for "Book 2," triangles 306 and 308 are visible (e.g., the visibility bit 32 is set to "1"), triangles 310 and 312 are not visible (e.g., the visibility bit 32 is set to "0") and triangles 314, 316, 318, and 320 are visible (e.g., the visibility bit 32 is set to "1").

As such, when the number of instances are more than one, there may be a per triangle visibility bit for each instance. The visibility descriptions in the primitive visibility buffer 30 may be used to improve the rendering process by only rendering triangles that are visible.

Figure 4:
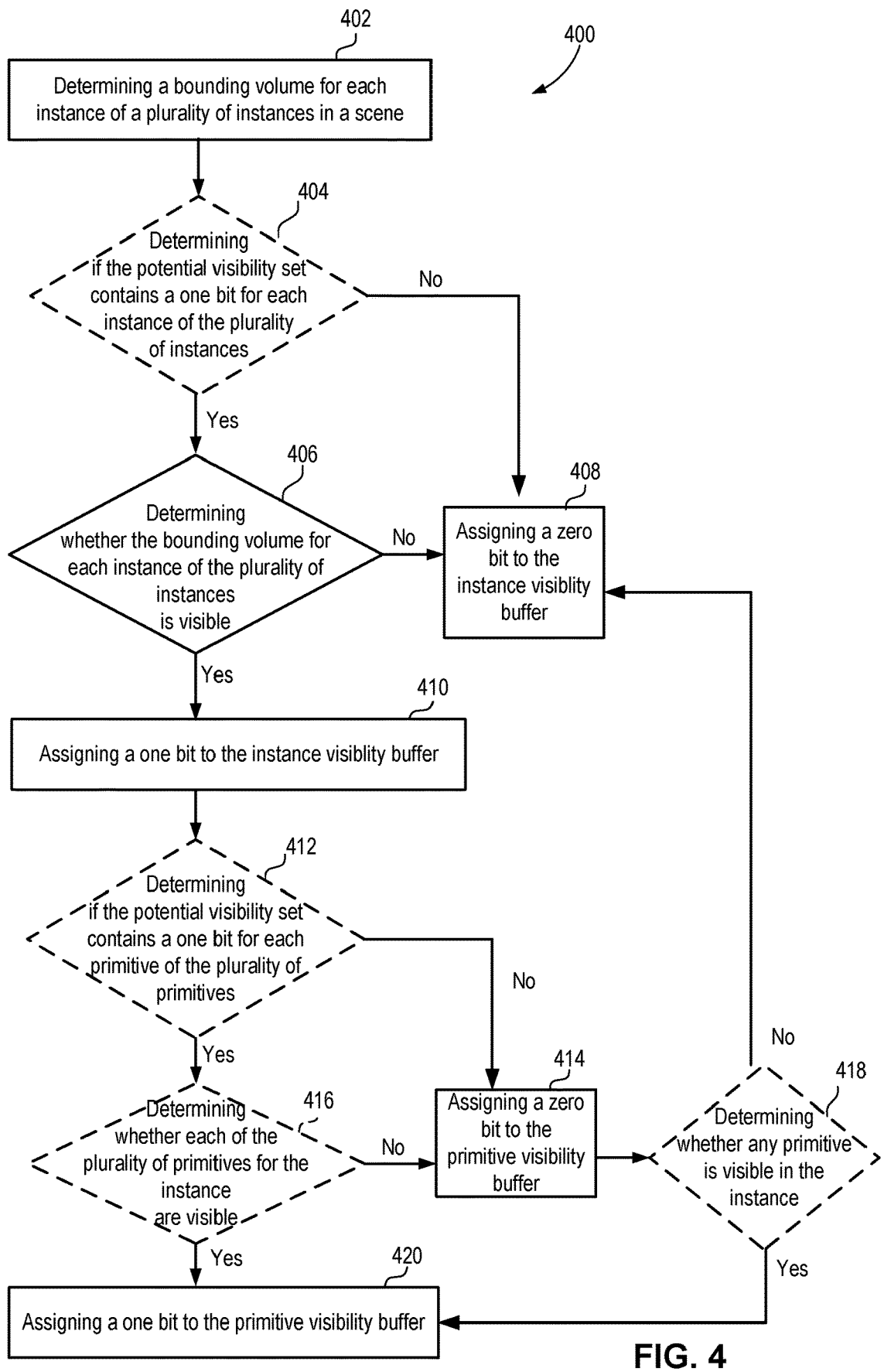
FIG. 4 is an example method flow for predetermining a visibility state of primitives in scenes of an application.

Referring now to FIG. 4, an example method 400 may be used by computer device 102 (FIG. 1) for predetermining a visibility state 23 (FIG. 1) of primitives 16 (FIG. 1) in scenes 12 (FIG. 1) of an application 10 (FIG. 1). The actions method 400 may be discussed below with reference to the architecture of FIG. 1.

At 402, method 400 may determine a bounding volume for each instance of a plurality of instances in a scene and/or image of the application. For example, visibility component 22 may determine a bounding volume 15 for each instance 14 in the scene 12 and/or image of application 10. Each instance 14 may be a logical mesh made up of a plurality of primitives 16 that depict objects in the scene 12 and/or image. The bounding volume 15 may completely contain the logical mesh of primitives 16 of the instance 14. For example, the bounding volume 15 may include, but is not limited to, a sphere and/or a box surrounding the instance 14. As such, the instances 14 may be represented using the bounding volume 15.

At 404, method 400 may optionally include determining if the potential visible set contains a one bit for each instance of the plurality of instances. An offline and/or a pre-computed visibility determination may be performed by, for example, computer device 102 on the primitives 16 of the instance 14 and/or the corresponding bounding volume 15 for the instance 14 to determine the potential visible set of instances 14 and/or primitives 16. For example, occlusion culling may be applied to the instance 14 to estimate whether the instance 14 may be visible in the scene 12 and/or image, or whether any of its primitives 16 may be visible in the scene 12 and/or image. This potential visibility set may be stored as bits per instance and/or bits per primitive. For example, the potential visibility set may be stored as a PVS instance buffer 27 and/or a PVS primitive buffer 31. The PVS instance buffer 27 may include a PVS bit 29 for each instance that describes the potential visibility of each instance 14 in the scene 12 and/or image. In addition, the PVS primitive buffer 31 may include a PVS bit 33 for each primitive 16 that describes the potential visibility of each primitive 16 in the scene 12 and/or image. Visibility component 22 may read the PVS instance buffer 27 to determine whether the PVS bit 29 for each instance 14 is set to "1."

At 408, method 400 may include assigning a zero bit to the instance visibility buffer. An instance visibility buffer 24 may include an instance visibility bit 28 for each of the instances 14 in a scene 12 and/or image. The instance visibility bit 28 may be set to "0" if the visibility state 25 of the instance 14 is determined to be not visible.

At 406, method 400 may include determining whether the bounding volume for each instance of the plurality of instances is visible. Visibility component 22 may perform one or more culling operations at runtime to determine the visibility of the one or more instances 14 in a scene 12 and/or image. In an implementation, if the instance visibility bit 28 is already set to "0" for the instance 14 in the instance visibility buffer 24 as a result of any predetermined visibility states, visibility component 22 may skip the runtime visibility determination for the instance 14. However, if the instance visibility bit 28 is set to "1" for the instance based at least on the predetermined visibility states, visibility component 22 may perform the runtime visibility determination for the instance 14 to verify that the instance 14 is visible in the scene 12 and/or image. For example, visibility component 22 may process a bounding volume 15 of the mesh associated with an instance 14 and compare the bounding volume 15 against a frustum and/or occlusion data to determine whether the instance 14 is visible, it may also perform culling based on distance or screen space area. When the comparison indicates that the instance 14 is visible, the visibility state 25 of the instance 14 may be set to visible. When the comparison indicates that the instance 14 is not visible, the visibility state 25 of the instance 14 may be set to not visible. In an implementation, visibility component 22 may perform one or more culling operations on the bounding volume 15 for a particular object (e.g., all of the candles) in the scene 12 and/or image before processing all of the meshes for a different object (e.g., books) in the scene 12 and/or image.

At 408, method 400 may include assigning a zero bit to the instance visibility buffer. When the visibility state 25 of the instance 14 is set to not visible, visibility component 22 may generate an instance visibility buffer 24 with an instance visibility bit 28 describing the visibility of the instances 14 in application 10. The instance visibility bit 28 may be set to "0" if the visibility state 25 of the instance 14 is not visible.

At 410, method 400 may include assigning a one bit to the instance visibility buffer. When the visibility state 25 of the instance 14 is set to visible, visibility component 22 may set the instance visibility bit 28 to "1." As such, the visibility of each instance 14 may be described using the instance visibility bit 28 instead of copying and/or compacting instance data (e.g., transformation matrices) based on the visibility result.

At 412, method 400 may optionally include determining whether the potentially visible set contains a one bit for each primitive of the plurality of primitives. For example, visibility component 22 may read the PVS primitive buffer 31 to determine whether the PVS bit 33 for each primitive 16 is set to "1." If the instance visibility bit 28 for an instance 14 is "0," the primitives 16 for that instance 14 may be skipped during the pre-computed visibility determination.

At 414, method 400 may include assigning a zero bit to the primitive visibility buffer. A primitive visibility buffer 30 may include a visibility bit 32 describing the visibility of each of the primitives 16 in an instance 14. The visibility bit 32 may be set to "0" if the visibility state 23 of the primitive is determined to be not visible.

At 416, method 400 may optionally include determining whether each of the plurality of primitives are visible. Visibility component 22 may perform one or more culling operations at runtime to determine a visibility state 23 of the one or more primitives 16 of an instance 14 in the scene 12 and/or image. In an implementation, if the visibility bit 32 is already set to "0" for the primitive 16 as a result of any predetermined visibility states, visibility component 22 may skip the runtime visibility determination for the primitive 16. In addition, if the if the visibility bit 32 is set to "1" for the primitive 16 as a result of any predetermined visibility states, visibility component 22 may skip the runtime visibility determination for the primitive 16 and may use the predetermined visibility state for the primitives 16. As such, visibility component 22 may only perform the runtime culling at the per instance level. In another implementation, if the visibility bit 32 is set to "1" for the primitive based at least on the predetermined visibility states, visibility component 22 may perform the runtime visibility determination for the primitive 16 to verify that the primitive 16 is visible in the scene 12 and/or image.

The visibility state 23 may identify whether the primitives 16 are visible or not visible by a camera in the scene 12 and/or image. For example, visibility component 22 may perform a back face culling operation to determine whether the primitives 16 are facing away from the camera. Visibility component 22 may also perform a frustum culling operating to determine whether the primitives 16 are within a view of a camera. Visibility component 22 may also perform a zero area culling operations to determine whether a size of the primitives 16 may be too small to make a contribution to the scene 12 and/or image. Visibility component 22 may also perform an occlusion culling to determine whether a primitive 16 is behind another object, and thus, may be obstructed from view.

At 414, method 400 may include assigning a zero bit to the primitive visibility buffer. Visibility component 22 may generate a primitive visibility buffer 30 with a visibility bit 32 describing the visibility of the primitives 16 for each of the instances 14. The visibility bit 32 may correspond to the visibility state 23 previously determined by visibility component 22. If the visibility state 23 is not visible for the primitive 16, the visibility bit 32 may be assigned a "0."

At 418, method 400 may optionally include determining whether any of the primitives are visible in the instance. For example, visibility component 22 may determine that all of the visibility bits 32 in the primitive visibility buffer 30 for the corresponding instance 14 may be "0." Thus, if no primitives 16 are visible in the instance 14 (e.g., all the visibility bits are assigned "0"), but the instance bounding volume 15 was visible (e.g., the instance visibility bit 28 was assigned a "1" for the instance 14), method 400 may set the instance visibility bit 28 to "0" in the instance visibility buffer 24 for the instance 14. However, if at least one primitive 16 is visible, the visibility state 25 of the instance may remain unchanged (e.g., the instance visibility bit 28 may remain a "1" for the instance 14).

At 420, method 400 may include assigning a one bit to the primitive visibility buffer. Visibility component 22 may set the visibility bit 32 to a "1" if the visibility state 23 is visible for the primitive 16. As such, a single bit may be used to describe the visibility state of each primitive 16 in the application 10. For example if there are 60 triangles per instance and 100 instances in the application 10, the primitive visibility buffer may include 6000 bits describing the visibility states 23 of each primitive 16 per instance. As such, when the number of instances 14 is more than one, the primitive visibility buffer 30 may include a per primitive visibility bit 32 for each instance 14.

In an implementation, a graphics shader 36, such as a compute shader, may execute the visibility component 22 to process the primitive pre-culling operations and/or the instance pre-culling operations and generate the primitive visibility buffer 30 and/or the instance visibility buffer 24. In another implementation, an input assembler or per primitive programmable shader stage 34 may execute the visibility component 22 to process the primitive pre-culling operations and/or the instance pre-culling operations and generate the primitive visibility buffer 30 and/or the instance visibility buffer 24.

A significant reduction in the memory and bandwidth requirement for both primitive pre-culling and hardware instancing may occur by using a single bit to identify the visibility states of the instances and/or primitives.

Figure 5:
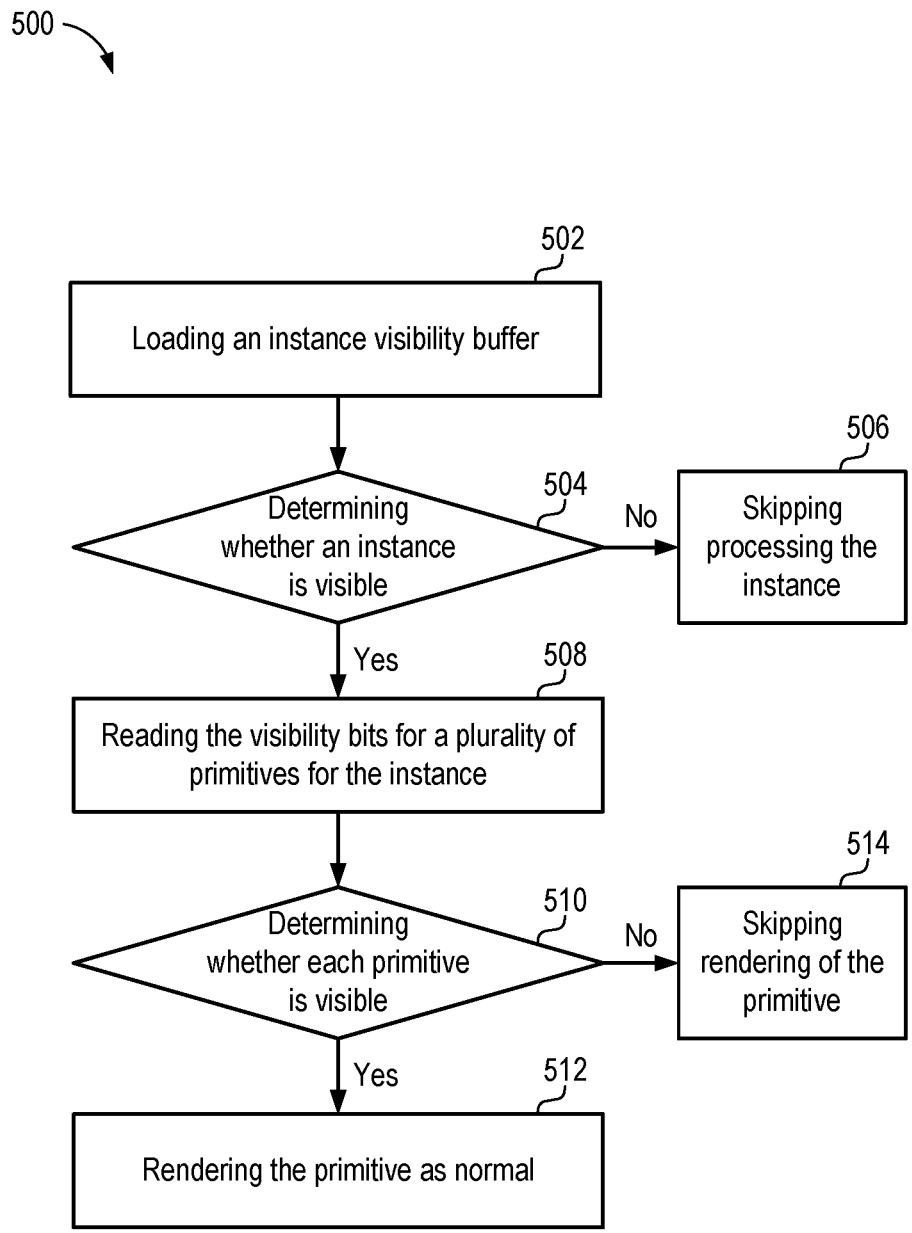
FIG. 5 is an example method flow for rendering visible primitives in a scene of an application.

Referring now to FIG. 5, an example method 500 may be used by computer device 102 (FIG. 1) for rendering visible primitives 16 (FIG. 1) in a scene 12 (FIG. 1) of an application 10 (FIG. 1). The actions method 500 may be discussed below with reference to the architecture of FIG. 1.

At 502, method 500 may include loading an instance visibility buffer. The instance visibility buffer 24 and/or primitive visibility buffer 30 may be stored in memory 46. At runtime of application 10, GPU 35 may copy the offline visibility results for the primitive visibility buffer 30 and/or the instance visibility buffer 24 into the frame's bit stream.

GPU 35 may perform a runtime culling process 37 that performs a runtime instance culling and/or primitive culling passes. The runtime culling and/or primitive passes may read the instance visibility buffer 24 and/or the primitive visibility buffer 30, and only perform a runtime check if the instance visibility bit 28 and/or visibility bit 32 is "1." GPU 35 may toggle the "1" to "0" if a finer grained runtime check concludes the instance 14 and/or primitive 16 are not visible. As such, the offline pre-computed visibility states may be efficiently combined with runtime visibility computations. In an implementation, GPU 35 may skip the runtime culling process 37 and may use the instance visibility bits 28 of the instance visibility buffer 24 without any runtime culling.

Input assembler or per primitive programmable shader stage 34, such as but not limited to, hull shaders, geometry shaders, and/or mesh shaders, may load the instance visibility buffer 24 and/or the primitive visibility buffer 30. The instance visibility buffer 24 may include for each instance 14 an instance visibility bit 28 that describes the visibility state 25 for each instance 14. The primitive visibility buffer 30 may include for each primitive 16 a visibility bit 32 that describes a visibility state 23 of the primitive 16 as visible or not visible.

At 504, method 500 may include determining whether an instance is visible. Input assembler or per primitive programmable shader stage 34 may determine whether an instance 14 is visible in the scene 12 based at least upon the instance visibility bits 28 in the instance visibility buffer 24. For example, if the instance visibility bit 28 is set to "1," input assembler or per primitive programmable shader stage 34 may determine that the instance 14 associated with the instance visibility bit 28 is visible. If the instance visibility bit 28 is set to "0," input assembler or per primitive programmable shader stage 34 may determine that the instance 14 associated with the instance visibility bit 28 is not visible.

At 506, method 500 may include skipping processing the instance. Input assembler or per primitive programmable shader stage 34 may skip entire instances 14 when the instance visibility bit 28 indicates that the instances 14 are not visible. As such, input assembler or per primitive programmable shader stage 34 may not process everything in the scene but may only process instances 14 that are visible. For example, when the instance visibility bit is "0," input assembler or per primitive programmable shader stage 34 may skip further processing of the primitives 16 associated with the nonvisible instance 14.

At 508, method 500 may include reading the visibility bits for a plurality of primitives for the instance. For example, when the instance visibility bits 28 are "1," input assembler or per primitive programmable shader stage 34 may further process the primitives 16 associated with the visible instances 14.

At 510, method 500 may include determining whether each primitive is visible. Input assembler or per primitive programmable shader stage 34 may determine whether a primitive 16 is visible in the scene based at least upon the visibility bit 32 of the primitive 16. For example, if the visibility bit 32 is set to "1," input assembler or per primitive programmable shader stage 34 may determine that the primitive 16 is visible. If the visibility bit 32 is set to "0," input assembler or per primitive programmable shader stage 34 may determine that the primitive 16 is not visible.

At 512, method 500 may include rendering the primitive as normal. Once input assembler or per primitive programmable shader stage 34 identifies the visible instances 14 and/or primitives 16 in the scene 12 (e.g., the visibility state 23, 25 of the primitives 16 and/or instances 14 are visible), a graphics shader 36, such as a pixel shader, may render the primitives 16.

At 514, method 500 may include skipping rendering the primitive. A graphics shader 36, such as a pixel shader, may skip rendering individual primitives 16 when the visibility bits 32 indicate that the primitives 16 are not visible in the scene 12. As such, the pixel shader may only shade the pixels of primitives 16 that are viewable in the scene 12.

The pixel pipeline may be kept busy by only rendering the primitives 16 that are visible. As such, the pixel pipeline may not have downtime trying to figure out whether a primitive 16 and/or instance 14 may be visible in the scene 12 and efficiency may be improved.

Therefore, a significant reduction in the memory and bandwidth requirement for both primitive pre-culling and hardware instancing may occur by using a single bit to identify the visibility states of the instances and/or primitives. In addition, all atomic memory operations may be removed, thus, simplifying the complexity of primitive culling. Moreover, copying transforms and obtaining a final count may not be necessary since the GPU may only load the transform data for instances which instance visibility bit 28 indicates are visible. As such, the per-instance data compaction step in hardware instance implementations may be removed, also the count of the total number of visible instances this frame.

Figure 6:
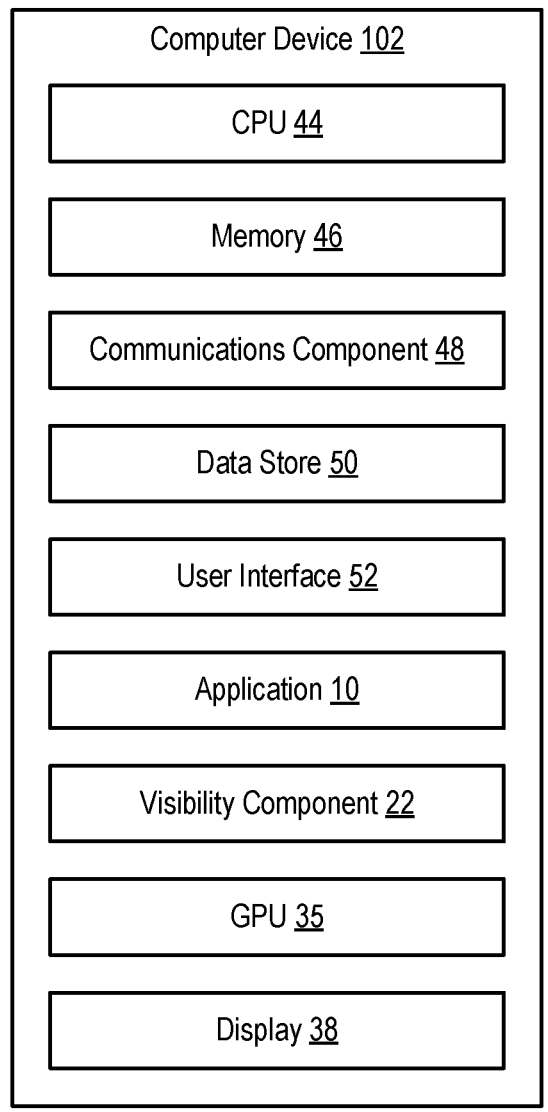
FIG. 6 is a schematic block diagram of an example device in accordance with an implementation of the present disclosure.

Referring now to FIG. 6, illustrated is an example computer device 102 in accordance with an implementation, including additional component details as compared to FIG. 1. In one example, computer device 102 may include CPU 44 for carrying out processing functions associated with one or more of components and functions described herein. CPU 44 can include a single or multiple set of processors or multi-core processors. Moreover, CPU 44 can be implemented as an integrated processing system and/or a distributed processing system.

Computer device 102 may further include memory 46, such as for storing local versions of applications being executed by CPU 44. Memory 46 can include a type of memory usable by a computer, such as random access memory (RAM), read only memory (ROM), tapes, magnetic discs, optical discs, volatile memory, non-volatile memory, and any combination thereof. Additionally, CPU 44 and memory 46 may include and execute operating system 110 (FIG. 1).

Further, computer device 102 may include a communications component 48 that provides for establishing and maintaining communications with one or more parties utilizing hardware, software, and services as described herein. Communications component 48 may carry communications between components on computer device 102, as well as between computer device 102 and external devices, such as devices located across a communications network and/or devices serially or locally connected to computer device 102. For example, communications component 48 may include one or more buses, and may further include transmit chain components and receive chain components associated with a transmitter and receiver, respectively, operable for interfacing with external devices.

Additionally, computer device 102 may include a data store 50, which can be any suitable combination of hardware and/or software, that provides for mass storage of information, databases, and programs employed in connection with implementations described herein. For example, data store 50 may be a data repository for applications 10 (FIG. 1), visibility component 22 (FIG. 1), GPU 35 (FIG. 1), and/or display 38 (FIG. 1).

Computer device 102 may also include a user interface component 52 operable to receive inputs from a user of computer device 102 and further operable to generate outputs for presentation to the user. User interface component 52 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 52 may include one or more output devices, including but not limited to a display, a speaker, a haptic feedback mechanism, a printer, any other mechanism capable of presenting an output to a user, or any combination thereof.

In an implementation, user interface component 52 may transmit and/or receive messages corresponding to the operation of applications 10, visibility component 22, GPU 35, and/or display 38. In addition, CPU 44 executes applications 10, visibility component 22, GPU 35, and/or display 38, and memory 46 or data store 50 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    a processor in communication with the memory;
    a graphics processing unit;
    an operating system in communication with the memory, the processor, and the graphics processing unit, wherein the graphics processing unit is operable to:
        load an instance visibility buffer that includes a plurality of instances, wherein the instance visibility buffer includes for each instance of the plurality of instances an instance visibility bit that describes the visibility state for each of the plurality of instances;
        determine whether at least one instance of the plurality of instances is visible in a scene of an application using the instance visibility bit;
        load a primitive visibility buffer that includes a plurality of primitives representing the at least one instance in the scene in response to the instance visibility bit indicating visible for the at least one instance, wherein the primitive visibility buffer includes for each primitive of the plurality of primitives a visibility bit that describes a visibility state as visible or not visible for each of the plurality primitives;
        determine whether each of the plurality of primitives are visible in the scene based on the visibility bit;
        render a primitive when the visibility bit for the primitive indicates that the primitive is visible; and
        skip the rendering of the primitive when the visibility bit for the primitive indicates that the primitive is not visible.

2. The computer device of claim 1, wherein the visibility bit for each of the plurality of primitives is determined by performing one or more culling operations on the plurality of primitives to determine a pre-computed visibility state of the plurality of primitives prior to a runtime of the application where the graphics processing unit renders the plurality of primitives.

3. The computer device of claim 1, wherein the visibility state for each of the plurality of primitives is determined by performing one or more culling operations on the plurality of primitives at runtime of the application based at least upon a current camera position.

4. The computer device of claim 1, wherein the graphics processing unit is further operable to read the bits for the primitives of each of the plurality of instances that the instance visibility bits indicate as visible.

5. The computer device of claim 1, wherein the graphics processing unit is further operable to skip processing of the primitives of each of the plurality of instances that the instance visibility bits indicate as not visible.

6. The computer device of claim 1, wherein the graphics processing unit is further operable to skip further processing of each of the plurality of instances that the instance visibility bits indicate as not visible.

7. The computer device of claim 1, wherein the instance visibility bit for each of the plurality of instances is determined by performing one or more culling operations on the plurality of instances to determine the visibility state of the plurality of instances.

8. The computer device of claim 1, wherein the instance visibility bit for each of the plurality of instances is determined based at least upon a pre-computed visibility of each of the plurality of instances.

9. The computer device of claim 1, wherein the graphics processing unit is further operable to:
    transmit the rendered primitive for presentation on a display.

10. The computer device of claim 1, wherein the graphics processing unit is further operable to:
    determine a bounding volume for each instance of the plurality of instances in the scene, wherein each instance depicts objects in the scene using primitives.

11. A method for rendering visible primitives in a scene of an application, comprising:
    loading, at a graphics processing unit executing on a computer device, an instance visibility buffer that includes a plurality of instances, wherein the instance visibility buffer includes for each instance of the plurality of instances an instance visibility bit that describes the visibility state for each of the plurality of instances;
    determining whether at least one instance of the plurality of instances is visible in a scene of an application using the instance visibility bit;
    loading, at the graphics processing unit, a primitive visibility buffer that includes a plurality of primitives representing the at least one instance in the scene in response to the instance visibility bit indicating visible for the at least one instance, wherein the primitive visibility buffer includes for each primitive of the plurality of primitives a visibility bit that describes a visibility state as visible or not visible for each of the plurality primitives;
    determining whether each of the plurality of primitives are visible in the scene based on visibility bit;
    rendering a primitive when the visibility bit for the primitive indicates that the primitive is visible; and
    skipping the rendering of the primitive when the visibility bit indicates that the primitive is not visible.

12. The method of claim 11, wherein the visibility bit for each of the plurality of primitives is determined by performing one or more culling operations on the plurality of primitives to determine a pre-computed visibility state of the plurality of primitives prior to a runtime of the application that renders the plurality of primitives.

13. The method of claim 11, wherein the visibility bit for each of the plurality of primitives is determined at runtime of the application one or more culling operations on the plurality of primitives based at least upon a current camera position.

14. The method of claim 11, further comprising:
reading the bits for the primitives of each of the plurality of instances that the instance visibility bits indicate as visible.

15. The method of claim 11, further comprising:
skipping further processing of the primitives of each of the plurality of instances that the instance visibility bits indicate as not visible.

16. The method of claim 11, further comprising:
skipping further processing of each of the plurality of instances that the instance visibility bits indicate as not visible.

17. The method of claim 11, wherein the instance visibility bit for each of the plurality of instances is determined by performing one or more culling operations on the plurality of instances to determine a visibility state of the plurality of instances prior to a runtime of the application.

18. The method of claim 11, further comprising:
transmitting the rendered primitive for presentation on a display.

19. A non-transitory computer-readable medium storing instructions executable by a computer device, comprising:
at least one instruction for causing the computer device to load an instance visibility buffer that includes a plurality of instances, wherein the instance visibility buffer includes for each instance of the plurality of instances an instance visibility bit that describes the visibility state for each of the plurality of instances;
at least one instruction for causing the computer device to determine whether at least one instance of the plurality of instances is visible in a scene of an application using the instance visibility bit;
at least one instruction for causing the computer device to load a primitive visibility buffer that includes a plurality of primitives representing the at least one instance in the scene in response to the instance visibility bit indicating visible for the at least one instance, wherein the primitive visibility buffer includes for each primitive of the plurality of primitives a visibility bit that describes a visibility state as visible or not visible for each of the plurality primitives;
at least one instruction for causing the computer device to determine whether each of the plurality of primitives are visible in the scene based on the visibility bit;
at least one instruction for causing the computer device to render a primitive when the visibility bit for the primitive indicates that the primitive is visible; and
at least one instruction for causing the computer device to skip the rendering of the primitive when the visibility bit for the primitive indicates that the primitive is not visible.

* * * * *